Oct. 19, 1943. J. J. ROHRBACH 2,332,261
METHOD FOR SECURING LENSES IN OPHTHALMIC MOUNTINGS
Filed Aug. 30, 1941
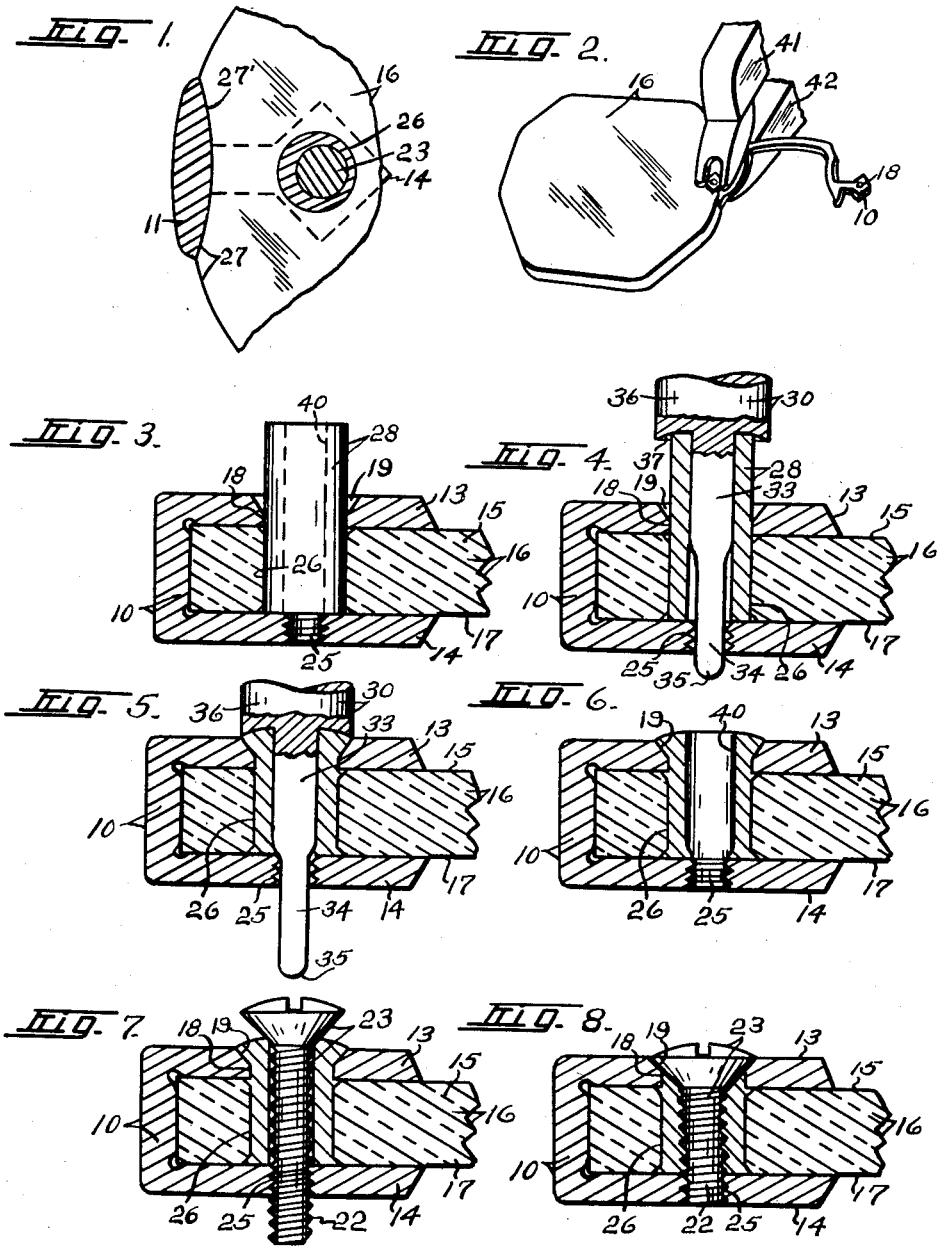
INVENTOR
JOHN J. ROHRBACH
BY Theodore E. Simonton
ATTORNEY Patented Oct. 19, 1943

2,332,261

UNITED STATES PATENT OFFICE 2,332,261

METHOD FOR SECURING LENSES IN OPHTHALMIC MOUNTINGS

John J. Rohrbach, Rochester, N. Y., assignor to Shuron Optical Company, Inc., Geneva, N. Y., a corporation of New York Application August 30, 1941, Serial No 409,042

6 Claims. (Cl. 88—47)

My invention relates to a method for securing lenses in an ophthalmic mounting and more specifically to the use of a pre-formed solder bushing which is remolded in place to provide a precise means for accurately and solidly anchoring the lens in the mounting.

An object of my invention is to provide a method for securely and accurately anchoring the lens in an ophthalmic mounting.

Another object of my invention is to provide a method for accurately recasting a solder bushing in the lens hole of a lens to be mounted in an ophthalmic mounting to provide a solid securing means for holding the lens in the mounting and for locking the glass screw in place.

Another object of my invention is to provide a method for permanently anchoring a lens in an ophthalmic mounting.

Still another object of my invention is to cast or form a bushing to receive a fastening screw in the lens hole of a lens after the lens has been accurately positioned to fit snugly in the lens strap of an ophthalmic mounting.

A further object of my invention is to cast or form an eccentric bushing in the hole of the lens mounted in a lens strap so that the lens screw will hold the lens tightly against the shoe of the lens strap.

Other objects and advantages of my invention will become apparent from reading the following description in conjunction with the drawing in which:

Figure 1 is a front view, parts being broken away and parts in section, showing a lens secured in an ophthalmic mounting by the method of my invention.

Figure 2 is a perspective view, parts being broken away, illustrating the first operation of my method.

Figure 3 is a section, part being broken away, taken through a lens strap and lens through the center line of the lens strap illustrating the second step of my method.

Figures 4, 5, 6, 7 and 8 are views similar to Figure 3 showing successive steps in my method.

Figure 9 is a view of a special awl which is used in carrying out my method.

The ordinary way of securing a lens in a rimless mounting is to provide a strap having two ears adapted to embrace the front and rear sides of the lens to be mounted and a shoe designed to bear against the edge of the lens. The strap ears are provided with apertures, one of which is threaded to accommodate a glass screw. A hole is drilled through the lens positioned so as to be in approximate alignment with the ear apertures when the lens is inserted in the strap. The glass screw is then inserted through one of the ears and through the hole in the lens and tightened into the threaded ear. With this simple type of mounting the glass screw bears against one side of the lens aperture, and if the lens is twisted in the mounting the twisting force is resisted by this bearing. As a result, the lenses are frequently broken out between the lens aperture and the edge of the lens. Twisting force on the lens also tends to bend the shoe, and after the lapse of time the twisting of the lens loosens the screw and the mounting becomes wobbly.

A great many attempts have been made to overcome the objections to this simple mounting by providing various types of bushings in the lens aperture surrounding the glass screw. Plastics, zylonite, cement and solder have all been used with more or less success. Solder bushings have certain advantages over plastics, zylonite or cement, but in the past the application of solder in the apertures of the small diameters required in ophthalmic mountings has presented many objectionable difficulties. One of these difficulties is the problem of getting the solder to flow and fill an aperture of small diameter. Another difficulty has been that of threading the glass screw into the threaded aperture while the solder is in a fluid state. The method of my invention overcomes these difficulties and provides a quick, easy, accurate and satisfactory method of using a fusible bushing and glass screw to obtain a secure mounting, and is particularly adapted for the use of a solder bushing.

In the preferred form, the lens strap 10 comprises a shoe 11 and the top and bottom ears 13 and 14. The top ear 13 extends over the front 15 of the lens 16, while the bottom ear 14 extends over the rear 17 of the lens 16. The top ear 13 is provided with an aperture 18 which has a countersunk portion 19. The aperture 18 is substantially greater in diameter than the threaded body 22 of the glass screw 23. The bottom ear 14 is provided with a threaded aperture 25 adapted to receive the threaded body portion 22 of the glass screw 23. The lens 16 is provided with an aperture 26 of substantially the same diameter as the aperture 18, and is positioned so that when the edge 27 of the lens 16 is firmly in engagement with the shoe 11, the aperture 26 will be in substantial alignment with the apertures 18 and 25. The hollow solder bushing 28 surrounds the glass screw 23 and substantially fills the aperture 26 and the aperture 18, thus providing a solid and accurate means for mounting the lens in the lens strap, and compensates for any inaccuracy of the drilling of the hole 26 in the lens 16 so that the edge 27 of the lens will be held tightly against the shoe 11 of the strap.

I have provided a special awl 30 for use in assembling the solder bushing 28 in the apertures 18 and 26. The awl, shown in Figure 9, comprises a handle 31 having a cylindrical metal prong 32 projecting from one end thereof. The prong 32 has a portion 33 of a diameter substantially equal to that of the body 22 of the glass screw 23. The portion 33 is approximately as long as the thickness of the lens 16 plus the thickness of the ear 13. Extending outward from the portion 33 and in axial alignment with it, is a portion 34 having a diameter substantially equal to the diameter of the aperture 25. The portion 34 is approximately the same length, or a little longer than the portion 33. The outer end 35 is tapered or rounded to facilitate the insertion of the awl into the aperture 25. A collar 36 on the portion 33 is provided with the undercut 37.

In the preferred form the solder bushing 28 is provided with a central longitudinal aperture 40 of substantially the same diameter as the glass screw 23.

My method of mounting a lens in a lens strap is as follows:

The lens strap 10 is placed between the jaws 41 and 42 of a clamping device and held therein. The jaws 41 and 42 are made of metal and are electrically insulated one from the other. Electric connections from a source of electric current are made to the jaws and a control provided for passing an electric current through the lens strap to heat the strap. It is, of course, understood that any suitable method for heating the strap can be used. An aperture 26 is drilled through the lens 16 at a distance from the edge 27 approximately corresponding to the distance from the edge of the shoe 11 to the aligned apertures 18 and 25 in the ears of the strap 10. With the strap 10 held in the jaws 41 and 42, the lens 16 is inserted in the strap 10 and held firmly against the shoe 11 with the lens aperture 26 in alignment with the ear apertures 18 and 25. The solder bushing 28 is then inserted loosely through the aperture 18 into the lens aperture 26 to come to rest on the bottom ear 14 and to project a substantial distance above the top ear as shown in Figure 3. The portion 34 of the awl 30 is then inserted in the bushing aperture 40 and pushed downwardly until the end 35 of the awl 30 enters the threaded aperture 25, as shown in Figure 4. The electric current is then turned on and the strap 10 heated until the solder bushing 28 is softened. The awl 30 is then pushed downwardly while the lens is still held firmly against the shoe and the undercut shoulder 37 forces the softened solder substantially to fill the lens aperture 26 and the aperture 18. At the same time the portion 34 of the awl 30, guided by the aperture 25, accurately aligns the portion 33 of the awl 30 concentric with the apertures 18 and 25 as shown in Figure 5. Thus, if the aperture 40 of the bushing 28 was not in accurate alignment with the apertures 18 and 25 when the bushing 28 was originally inserted, the use of the awl 30 in the softened bushing 28 corrects any such misalignment. The heat is now removed and the solder allowed to set with the awl 30 in place. After the solder is set, the awl is removed and the recast solder bushing appears as shown in Figure 6. Any excess solder forced out around the awl 30 may be scraped off or otherwise removed. The glass screw 23 is then inserted in the aperture 40 and screwed into the threaded aperture 25 until the head of the glass screw comes in contact with the bushing 28 (see Figure 7). The strap 10 is reheated and while the solder is in a softened state the glass screw 23 is tightened to bring the head down into the countersink 19 and draw the ears 13 and 14 against the sides of the lens 16. The heat is removed from the strap 10, the solder allowed to set, and the projecting end of the glass screw 23 is cut off and finished.

It is to be noted that if the awl 30 is formed with a tapered shoulder complementary to the countersink 19, instead of being undercut as at 37, any excess solder will be forced out of the countersink 19 and the glass screw 23 may be inserted and tightened without re-heating the bushing 28. However, it is preferred to use the method including the second heating operation while the screw is being driven home as the re-softened solder tends to fill the screw threads and anchor the screw 23 in place.

Although my method for securing lenses in lens straps is adapted for use with any of the ordinary lens straps, in Figure 1 I have illustrated a particular lens strap having a solid shoe 11 with a curved inner face. When using this type of lens strap the lens 16 is prepared by first drilling the lens aperture 26. The edge of the lens is then ground to provide the seat 27' located accurately from the lens aperture 26. This scheme of grinding a seat on the lens provides a means for accurately locating the center of the lens aperture with respect to the seat in order that the distance from the center of the aperture to the seat may correspond accurately with the distance from the center line of the aligned apertures 18 and 25 of the strap 10 to the edge of the shoe 11.

The use of the solid shoe strap with the solder bushing for anchoring the lens to the strap provides a very solid and substantial mounting. The rigidity of this construction holds the lenses in proper alignment without sagging or displacement even under the most adverse conditions of misuse and mishandling. The solder bushing adds to the rigidity of the solid shoe strap and the ground lens seat, a permanent anchoring feature and a means for distributing a stress imposed on the glass lens over a substantially greater area than does a loose fitting screw with a consequent reduction of the likelihood of breakage in the area between the lens aperture and the edge of the lens.

I claim:

1. The method of anchoring an eyeglass lens in a lens strap having a pair of ears comprising a top ear and a bottom ear adapted to embrace the corresponding surfaces of said lens, and a threaded screw having a head, said top ear being provided with an aperture of substantially greater diameter than the body of said screw, and said bottom ear being provided with a threaded aperture adapted to mate with said screw and vertically aligned with said top ear aperture, said method comprising, providing a hole through said lens of substantially greater diameter than the body of said screw and positioned substantially to align with the apertures in said strap ears, positioning said lens between said strap ears, inserting an apertured bushing of heat softenable material into said top ear aperture and into said lens hole so as to rest on said bottom ear, inserting an awl through said bushing aperture to enter and plug said bottom ear aperture, said awl being provided with a portion having a diameter substantially equal to the diameter of the threaded aperture, a second portion of enlarged diameter substantially equal to the diameter of the screw, and an annular shoulder at the upper end of said enlarged portion, heating said bushing to soften the same, forcing said awl against said bushing and causing said bushing to substantially fill said lens hole and said top ear aperture while simultaneously aligning said bushing aperture with said bottom ear aperture, allowing said bushing to cool and harden, removing said awl, inserting said screw into said bushing aperture, and threading said screw into said bottom ear aperture.

2. The method of anchoring an eyeglass lens in a lens strap having a pair of ears comprising a top ear and a bottom ear adapted to embrace the corresponding surfaces of said lens, and a threaded screw having a head, said top ear being provided with an aperture of substantially greater diameter than the body of said screw, and said bottom ear being provided with a threaded aperture adapted to mate with said screw and vertically aligned with said top ear aperture, said method comprising, providing a hole through said lens of substantially greater diameter than the body of said screw and positioned substantially to align with the apertures in said strap ears, positioning said lens between said strap ears, inserting an apertured bushing of heat softenable material into said top ear aperture and into said lens hole so as to rest on said bottom ear, inserting an awl through said bushing aperture to enter and plug said bottom ear aperture, said awl being provided with a portion having a diameter substantially equal to the diameter of the threaded aperture, a second portion of enlarged diameter substantially equal to the diameter of the screw, and an annular shoulder at the upper end of said enlarged portion, heating said bushing to soften the same, forcing said awl against said bushing and causing said bushing to substantially fill said lens hole and said top ear aperture while simultaneously aligning said bushing aperture with said bottom ear aperture, allowing said bushing to cool and harden, removing said awl, inserting said screw into said bushing aperture, threading said screw into said bottom ear aperture, re-heating said bushing to soften the same, tightening said screw while said bushing is soft, and allowing said bushing to cool and harden.

3. The method of anchoring an eyeglass lens in a lens strap having a shoe adapted to fit against the lens edge and a pair of ears comprising a top ear and a bottom ear adapted to embrace the corresponding surfaces of said lens, and a threaded screw having a head, said top ear being provided with a countersunk aperture of substantially greater diameter than the body of said screw, and said bottom ear being provided with a threaded aperture adapted to mate with said screw and vertically aligned with said top ear aperture, said method comprising, providing a hole through said lens of substantially greater diameter than the body of said screw and positioned substantially to align with the apertures in said strap ears, positioning said lens between said strap ears with the edge of said lens in tight engagement with said shoe, inserting an apertured cylindrical bushing of low melting temperature solder into said top ear aperture and into said lens hole so as to rest on said bottom ear, inserting an awl through said bushing aperture to enter and plug said bottom ear aperture, said awl being provided with a portion having a diameter substantially equal to the diameter of the threaded aperture, a second portion of enlarged diameter substantially equal to the diameter of the screw, and an annular shoulder at the upper end of said enlarged portion, heating said lens strap to soften said bushing, forcing said awl against said bushing and causing said solder to substantially fill said lens hole and countersunk aperture while simultaneously aligning the aperture through said bushing with the threaded aperture in the bottom strap, allowing said strap and solder to cool, removing said awl, inserting said screw in said bushing aperture, and threading said screw into said bottom ear aperture.

4. The method of anchoring an eyeglass lens in a lens strap having a shoe adapted to fit against the lens edge and a pair of ears comprising a top ear and a bottom ear adapted to embrace the corresponding surfaces of said lens, and a threaded screw having a head, said top ear being provided with a countersunk aperture of substantially greater diameter than the body of said screw, and said bottom ear being provided with a threaded aperture adapted to mate with said screw and vertically aligned with said top ear aperture, said method comprising, providing a hole through said lens of substantially greater diameter than the body of said screw and positioned substantially to align with the apertures in said strap ears, positioning said lens between said strap ears with the edge of said lens in tight engagement with said shoe, inserting an apertured cylindrical bushing of low melting temperature solder into said top ear aperture and into said lens hole so as to rest on said bottom ear, inserting an awl through said bushing aperture to enter and plug said bottom ear aperture, said awl being provided with a portion having a diameter substantially equal to the diameter of the threaded aperture, a second portion of enlarged diameter substantially equal to the diameter of the screw, and an annular shoulder at the upper end of said enlarged portion, heating said lens strap to soften said bushing, forcing said awl against said bushing and causing said solder to substantially fill said lens hole and countersunk aperture while simultaneously aligning the aperture through said bushing with the threaded aperture in the bottom strap, allowing said strap and solder to cool, removing said awl, inserting said screw in said bushing aperture, tightening said screw head down on said bushing, re-heating said strap to soften said solder, tightening said screw to tighten said strap ears against said lens, and allowing said strap to cool and said solder to set.

5. The method of anchoring an eyeglass lens in a lens strap having a solid shoe adapted to fit against the lens edge and a pair of ears comprising a top ear and a bottom ear adapted to embrace the corresponding surfaces of said lens, and a threaded screw having a head, said top ear being provided with an aperture of substantially greater diameter than the body of said screw, and said bottom ear being provided with a threaded aperture adapted to mate with said screw and vertically aligned with said top ear aperture, said method comprising, drilling through said lens at a predetermined distance from the edge thereof a hole having a diameter substantially equal to the aperture in said top ear, thereafter grinding a bearing surface on the lens edge adjacent said hole and locating said surface a distance from said hole substantially equal to the distance from the inside of said shoe to said strap ear apertures, placing said lens in said strap with said bearing surface of said lens in tight engagement with said solid shoe, inserting a solder bushing having a central cylindrical aperture extending therethrough into said top ear aperture and into said lens hole so as to rest on said bottom ear, inserting an awl through said bushing aperture to enter and plug said bottom ear aperture, said awl being provided with a portion having a diameter substantially equal to the diameter of the threaded aperture, a second portion of enlarged diameter substantially equal to the diameter of the screw, and an annular shoulder at the upper end of said enlarged portion, heating said bushing to soften the same, forcing said awl against said bushing and causing said bushing to substantially fill said lens hole and said top ear aperture while simultaneously aligning said bushing aperture with said bottom ear aperture, allowing said bushing to cool and harden, removing said awl, inserting said screw into said bushing aperture, and threading said screw into said bottom ear aperture.

6. The method of anchoring an eyeglass lens in a lens strap having a solid shoe adapted to fit against the lens edge and a pair of ears comprising a top ear and a bottom ear adapted to embrace the corresponding surfaces of said lens, and a threaded screw having a head, said top ear being provided with an aperture of substantially greater diameter than the body of said screw, and said bottom ear being provided with a threaded aperture adapted to mate with said screw and vertically aligned with said top ear aperture, said method comprising, drilling through said lens at a predetermined distance from the edge thereof a hole having a diameter substantially equal to the aperture in said top ear, thereafter grinding a bearing surface on the lens edge adjacent said hole and locating said surface a distance from said hole substantially equal to the distance from the inside of said shoe to said strap ear apertures, placing said lens in said strap with said bearing surface of said lens in tight engagement with said solid shoe, inserting a solder bushing having a central cylindrical aperture extending therethrough into said top ear aperture and into said lens hole so as to rest on said bottom ear, said bushing extending above said top ear, inserting an awl through said bushing aperture to enter and plug said bottom ear aperture, said awl being provided with a portion having a diameter substantially equal to the diameter of the threaded aperture, a second portion of enlarged diameter substantially equal to the diameter of the screw, and an annular shoulder at the upper end of said enlarged portion, heating said bushing to soften the same, forcing said awl against said bushing and causing said bushing to substantially fill said lens hole and said top ear apertures while simultaneously aligning said bushing aperture with said bottom ear aperture, allowing said bushing to cool and harden, removing said awl, inserting said screw into said bushing aperture, threading said screw into said bottom ear aperture, reheating said bushing to soften the same, tightening said screw while said bushing is soft, and allowing said bushing to cool and harden.

JOHN J. ROHRBACH.